United States Patent [19]

Hiruta et al.

[11] Patent Number: 5,383,623
[45] Date of Patent: * Jan. 24, 1995

[54] ROTARY ACTUATOR-OPERATED SEAT BELT PRETENSIONER

[75] Inventors: Mitsuhiko Hiruta; Ryoichi Yoshida; Muneo Nishizawa; Koji Hiramatsu, all of Shiga, Japan

[73] Assignee: Takata Corporation, Tokyo, Japan

[*] Notice: The portion of the term of this patent subsequent to Sep. 28, 2010 has been disclaimed.

[21] Appl. No.: 16,763

[22] Filed: Feb. 11, 1993

Related U.S. Application Data

[63] Continuation-in-part of Ser. No. 908,189, Jul. 1, 1992, Pat. No. 5,248,110.

[30] Foreign Application Priority Data

Feb. 13, 1992 [JP] Japan .................................. 4-058840
Dec. 9, 1992 [JP] Japan .................................. 4-351566
Dec. 9, 1992 [JP] Japan .................................. 4-351567
Dec. 9, 1992 [JP] Japan .................................. 4-351568

[51] Int. Cl.⁶ .......................................... B60R 22/46
[52] U.S. Cl. ..................................... 242/374; 280/806
[58] Field of Search ......... 242/107, 107.4 A, 107.4 B, 242/107.4 R, 374; 280/806; 297/476, 477, 478, 480

[56] References Cited

U.S. PATENT DOCUMENTS

| 4,014,479 | 3/1977 | Nilsson et al. | 242/107.4 A X |
| 4,151,967 | 5/1979 | Lindblad | 242/107.4 R |
| 4,230,288 | 10/1980 | Fohl | 242/107 |
| 4,455,000 | 6/1984 | Nilsson | 242/107 X |
| 4,558,832 | 12/1985 | Nilsson | 242/107 |
| 4,597,586 | 7/1986 | Burghardt et al. | 280/806 |
| 5,050,814 | 9/1991 | Butenop et al. | 242/107 |

FOREIGN PATENT DOCUMENTS

2505626 8/1976 Germany .
6045449 11/1985 Japan .

*Primary Examiner*—John M. Jillions
*Attorney, Agent, or Firm*—Brumbaugh, Graves, Donohue & Raymond

[57] ABSTRACT

A rotary actuator-operated seat belt pretensioner comprises a frame, a belt take-up shaft rotatably mounted on the frame, and a rotary actuator mounted on the frame and including a pressure chamber, a rotating member and a gas generator for supplying pressurized gas to the pressure chamber to impart rotation to the rotating member. A clutch is interposed between the rotating member and the take-up shaft. The pressure chamber of the actuator is annular and includes an inner wall defining a space within the chamber, and the clutch is received in the space within the chamber. The driving force of the rotating member produced by gas pressure supplied to the pressure chamber is transmitted to the take-up shaft by the clutch, and rotation of the take-up shaft winds a segment of the belt onto the shaft and thereby tightens the belt.

10 Claims, 13 Drawing Sheets

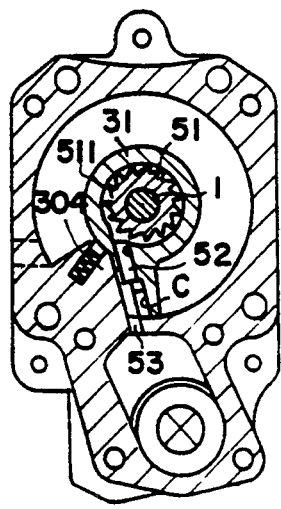 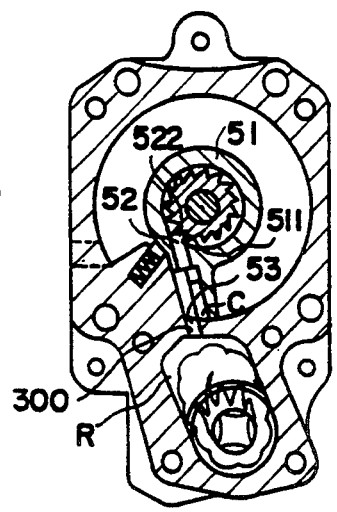 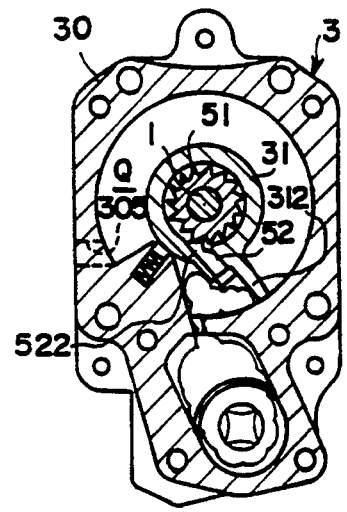
FIG. 17A  FIG. 17B  FIG. 17C
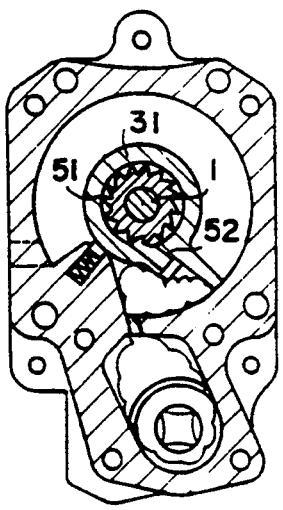 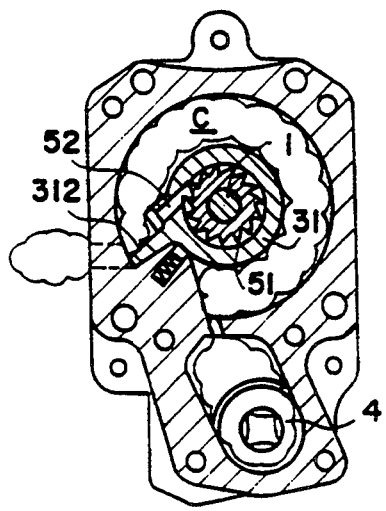 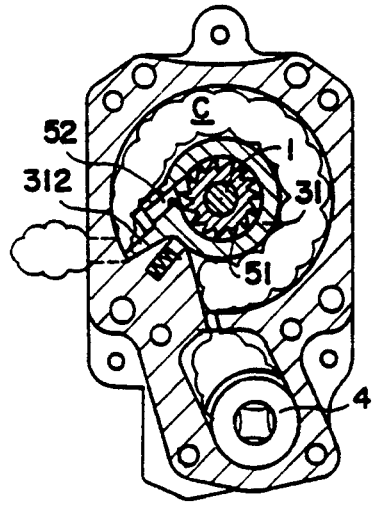
FIG. 17D  FIG. 17E  FIG. 17F

ROTARY ACTUATOR-OPERATED SEAT BELT PRETENSIONER

This application is a continuation-in-part of U.S. patent application Ser. No. 908,189 Jul. 1, 1992, now U.S. Pat. No. 5,248,110 (Sep. 28, 1993).

BACKGROUND OF THE INVENTION

The present invention relates to a pretensioner for a seat belt system and, in particular, to a pretensioner in which a seat belt take-up shaft is rotated by a rotary actuator operated by gas pressure.

Pretensioners are increasingly being provided in the seat belt systems of vehicles to tighten the belt, which is loosely held in engagement with the vehicle occupant, in an emergency such as vehicle collision and to restrain the body of the occupant more effectively. Various types of operating mechanisms for pretensioners are known. One type of mechanism has a rotary actuator operated by gas pressure in which a belt take-up shaft or a take-up reel is rotated by a rotating member of the actuator. Pretensioners of that type are disclosed in U.S. Pat. No. 4,455,000 ("Ref. 1"), Japanese Patent Laid-Open Publication No. 58-195571 (corresponding to U.S. Pat. No. 4,588,832, "Ref. 2"), Japanese Patent Publication No. 59-15657 ("Ref. 3"), and Japanese Patent Laid-Open Publication No. 60-45449 ("Ref. 4").

When a seat belt retractor is used for a take-up mechanism for pretensioning the belt, the pretensioner must not interfere with the normal belt-winding and pull-out operation of the retractor. Thus, the rotating member of the pretensioner actuator is separated from the seat belt take-up shaft or take-up reel when not in operation, and is engaged with them only during operation.

A clutch mechanism is needed for the separation, but in each of the references referred to above, the clutch mechanism is complicated and costly, such as the arrangements of Ref. 1, 2 and 4. Moreover, a take-up shaft of greater length is required, because the clutch mechanism is arranged in series with the rotating member in the axial direction of the take-up shaft. In Ref. 3, a more reasonable arrangement, in which a pin supported on a vane is operated by gas pressure, is proposed. However, since the engaging part of the pin is received in an axial hole in a flange of the take-up reel, there is some restriction to the alignment pitch of the hole with respect to hole diameter, and the device cannot be made to have an accurate and precise operation. this leads to the problem that there is undesirable play with respect to when engagement occurs. Also, because the engagement of the pin with the hole is only achievable after the vane is rotated, the engaging operation is not consistent.

SUMMARY OF THE INVENTION

To solve the above problems, it is an object of the present invention to provide a pretensioner for rotating a seat belt take-up shaft by a rotary actuator in which the axial length of the seat belt take-up shaft is kept small by improvements of the actuator and clutch mechanism and the mounting positions of these components in order to ensure more reliable and smooth engaging operation between the rotating member of the actuator and the seat belt take-up shaft.

In addition, it is another object of the present invention to provide a rotary actuator-operated pretensioner, wherein a sufficient winding stroke can be maintained by inertial rotation of the take-up shaft.

The foregoing objects are attained, in accordance with the present invention, by a rotary actuator-operated seat belt pretensioner having a frame, a belt take-up shaft rotatably mounted on the frame, a rotary actuator mounted on the frame and including a pressure chamber, a rotating member and a gas generator for supplying pressurized gas to the pressure chamber to impart rotation the rotating member, and a clutch interposed between the rotating member and the take-up shaft. The invention is characterized in that the pressure chamber of the actuator is annular and includes an inner wall defining a space within the chamber, and the clutch is received in the space within the chamber.

By the above arrangement, a space for the clutch engagement is provided by the use of dead space inside the annular actuator, and the size in the axial direction of the entire pretensioner unit can be kept small by mounting the clutch means in the dead space.

In some embodiments, the clutch includes a driving engagement member movably carried by the rotating member and a driven engagement member mounted on the take-up shaft, and the driving engagement member has a pressure-receiving portion facing the pressure chamber so as to be moved into engagement with the driven engagement member by a force due to gas pressure supplied by the pressure generator to the pressure chamber acting on the pressure-receiving portion. In other embodiments, the clutch has a driven engagement member mounted on the take-up shaft and a driving engagement member mounted on the rotating member and engaged by rotation of the rotating member with the driven engagement member.

Advantageously, the driven engagement member of the clutch may be a ratchet wheel mounted on the take-up reel and the driving engagement member of the clutch may include a clutch key movably carried by the rotating member for movement into engagement with the ratchet wheel along an axis of movement that intersects a portion of the ratchet wheel and is substantially orthogonal to the axis of rotation of the take-up reel shaft. It is desirable, as explained below, that the axis of movement of the clutch key and the axis of rotation of the take-up shaft be spaced apart by a predetermined offset distance.

In the pretensioner, according to the invention, the gas generator is operated by a signal from an electrical or mechanical sensor that responds to acceleration. When the operating gas is supplied to the pressure chamber of the actuator, the pressure of the gas acts on the rotating member and also on the pressure-receiving portion of the clutch key. The clutch key is pushed toward the ratchet wheel, which is situated in a spaced defined within the inner wall of the actuator and is engaged by the key. The rotating member is connected to the take-up shaft, and the rotating force of the rotating member is transmitted to the seat belt take-up shaft through the clutch means. As the result of the shaft rotation, the belt is pretensioned by winding up of a belt segment on the belt reel. By operation of this ratchet-type mechanism, it is possible to ensure reliable engagement between the rotating member and the seat belt take-up shaft.

When the axis along which the clutch key moves to engage the ratchet wheel is spaced apart (offset) from the axis of rotation of the take-up shaft by a predetermined spacing, the impact force caused by a collision of the clutch key against the ratchet wheel when the clutch is engaged is mostly converted to a rotating force with respect to the ratchet wheel. The impact bending load applied on the take-up shaft is considerably reduced by that arrangement.

In particular, even when addenda of the ratchet wheel and the clutch key collide against each other, the addenda are easily deviated, and this ensures stable clutch-engaging operation at all times. By offsetting the axis of movement of the clutch key, the strength of shaft can be kept small because the impact force of the clutch engagement exerts only a small bending stress on the take-up shaft, and this makes it possible to have a lightweight shaft.

According to another aspect of the present invention, a clutch key connector is provided for sequence control of the movement of the clutch key into engagement with the ratchet wheel and of the rotation of the rotary member caused by the gas pressure introduced into the pressure chamber by the gas generator. With sequence control, the delivery of operating gas pressure to the clutch key and the supply of the operating gas to the pressure chamber for imparting rotation to the operating member can be controlled in sequence when the operating gas is supplied to the pressure chamber of the actuator. Therefore, by the transmission of gas pressure from the key connector, the clutch key is initially moved toward the ratchet wheel located in a space defined in the inner free space of the actuator, and the clutch key is brought into contact with the ratchet wheel. Then, the supply of the operating gas to the pressure chamber by the key connector commences, and the rotating member starts to rotate. Thus, the clutch key and the ratchet wheel are engaged with each other, directly if they are already in the engaging state, or along with the rotation of the rotating member if they are in a contact state, and the rotating force of the rotating member is transmitted to the seat belt take-up shaft.

With the above arrangements, sequence control of the key connector ensures initiation of rotor rotation only after the clutch-engaging condition has been established, and even when addenda of the ratchet wheel and the clutch key collide against each other, the addenda are easily deviated and are engaged with the adjacent addenda. This contributes to stable operation of the clutch at all times.

The clutch may be an overrunning clutch that allows rotation of the take-up shaft by inertia beyond the amount of rotation of the rotating member of the actuator. With an overrunning clutch, even when the rotating member of the actuator reaches the end of its stroke and stops, the take-up shaft, which has been driven by the rotating member, continues its rotation by inertia. Thus, the take-up shaft rotation exceeds that of the rotating member, and the overrunning clutch is released. As the result, the take-up shaft continues to rotate and takes up the belt until the moment of inertia reaches equilibrium with the belt tension.

The invention makes it possible to minimize the increase in the axial length of the seat belt take-up shaft due to overlapping of the actuator and the clutch mechanism in a direction transverse to the shaft axis. It is also possible to maintain a sufficient winding stroke, which may exceed that of the actuator.

For a better understanding of the invention, reference may be made to the following description of an exemplary embodiment, taken in conjunction with the accompanying drawings.

DESCRIPTION OF THE DRAWINGS

FIGS. 17A to 17F show the operation of the eighth embodiment, sequentially.

DESCRIPTION OF THE EMBODIMENTS

Figure 1:
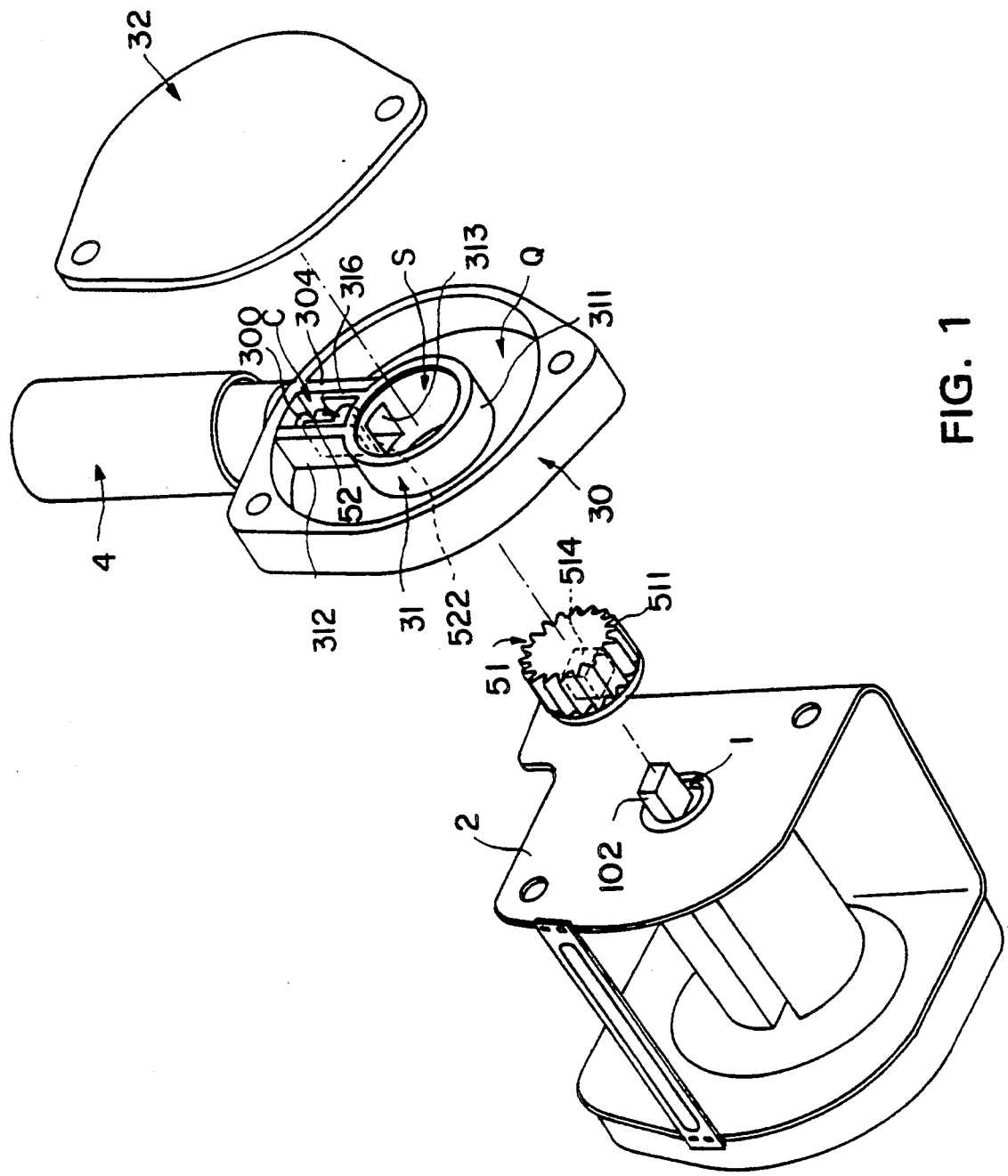
FIG. 1 is a perspective view of a first embodiment of a rotary actuator-operated pretensioner according to the present invention, showing the components partially exploded.
Figure 2C:
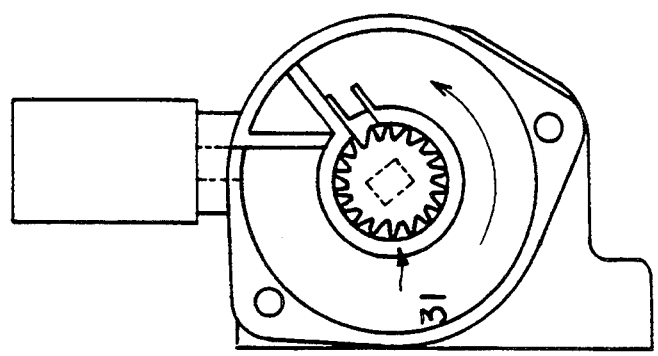
FIGS. 2A to 2C show step by step the operation of the first embodiment.

In the first embodiment of the invention (FIGS. 1 and 2), a pretensioner base 2 is shown in FIG. 1 rotated by 180 degrees around the axis with respect to the position shown in FIG. 2. A rectangular portion 102 is formed on one end of a seat belt take-up shaft 1 (hereinafter referred to simply as the "take-up shaft"), which is rotatably supported on the pretensioner base 2 that also serves as a retractor frame. The rectangular shaft portion 102 is engaged in a rectangular hole 514 formed on a ratchet wheel 51. The ratchet wheel 51, constituting a driven engagement member, is thereby mounted on one end of the take-up shaft 1. The ratchet wheel 51 has inclined ratchet teeth 511 on its periphery.

A cylinder 30 is mounted on the pretensioner base 2 by suitable fasteners, such as screws. The cylinder 30 has an annular operation space Q, one side of which is open. The wall of the cylinder 30 facing the pretensioner base 2 has a hole (only barely visible in FIG. 1) to receive the ratchet wheel 51. A bulkhead 304 extends inwardly from a cylindrical peripheral wall of the cylinder in an approximately radial direction. A hole 300 in the peripheral wall near the bulkhead 304 serves as a gas inlet hole, as described below.

The cylinder 30 receives a rotor 31, which is rotatably supported on the ratchet wheel 51. The rotor 31 comprises a ring segment 311, serving as a bearing for rotatable support on the outer periphery of the ratchet wheel 51, and a vane 312, serving as a pressure-receiving portion and extending outwardly in approximately the radial direction with respect to the ring segment 311. In cooperating with a bulkhead 304 of the cylinder 30 and with a cover 32, which serves as an end wall closing the open side of the operating space Q of the cylinder 30, the ring segment 311 and the vane 312 divide the space in the cylinder 30 into an operating space Q and an engaging space where the ratchet wheel 51 is located. Also, the operating space is divided by the vane into a pressure chamber C and a back pressure chamber.

To separate an inner bore space S of the cylinder 30 from the pressure chamber C, a clutch key 52 is provided, which serves as a driving engagement member and is supported on one side by the vane 312 of the rotor 31 and by a guide member 316 on the opposite side so that the clutch key can be displaced in the radial direction. The clutch key 52 has a tip 522 shaped to engage the teeth 511 of the ratchet wheel 51. A rectangular hole 313 in the ring segment 311 of the rotor 31 permits the clutch key to move inwardly and engage the ratchet wheel 51.

A gas generator 4 is mounted outside the cylinder 30. The gas supply hole of the gas generator 4 communicates with the hole 300 in the peripheral wall of the cylinder 30 that leads to the pressure chamber C.

In the ratchet wheel 51 of the first embodiment, the teeth 511 on the outer periphery are inclined backwardly with respect to the rotating direction of the ratchet wheel 51. The tip 522 of the clutch key 52 is also of inclined form to match the profile of the ratchet teeth 511, thereby to prevent disengagement of the pawl 522 from the outer tooth 511 and also to ensure smooth engagement.

Figure 2B:
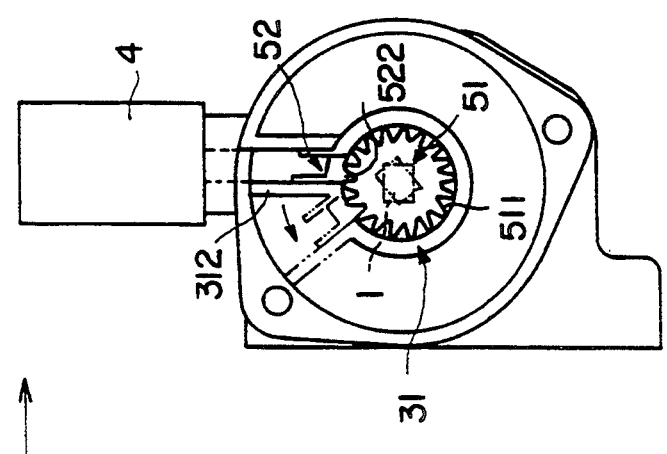
Figure 2A:
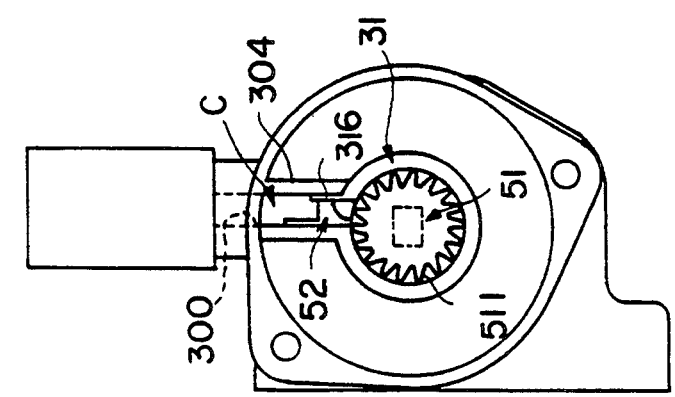

When not in operation, the rotor 31 is at the position shown in FIG. 2A. The guide member 316 of the rotor 31 contacts the bulkhead 304. Under this condition, the pressure chamber C in the operating space Q has its smallest volume, and the clutch key 52 is held positioned by suitable means, such as a shear pin (not shown), so that it does not engage the teeth 511 of the ratchet wheel 51. Therefore, even when the belt take-up shaft of a belt retractor is used as the take-up shaft 1 of the pretensioner, the retractor can function normally.

When the gas generator is operated, such as by an electric signal, and generated gas is introduced into the pressure chamber C through the supply hole and the gas inlet hole 300, the clutch key 52 is displaced toward the ratchet wheel 51 by the force of the gas pressure applied on its radially outer end, and it is moved to the position shown by solid lines in FIG. 2B. In this case, the tip 522 seats in a space between two teeth 511 of the ratchet wheel 51, and the rotor 31 is engaged with the ratchet wheel 51 by the clutch key 52. Meanwhile, gas pressure also acts on the vane 312, pushing it circumferentially, and the rotor 31 is rotated around the axis as shown by two-dot chain line FIG. 2B. The rotating force is transmitted to the take-up shaft 1 through the clutch key 52 and the ratchet wheel 51.

Upon the rotation of the take-up shaft 1, a segment of the belt is wound onto the take-up shaft 1, and pretension is imparted by tightening of the belt. Finally, the rotor 31 reaches the position shown in FIG. 3C, and the pretensioning operation is thus completed.

Figure 3:
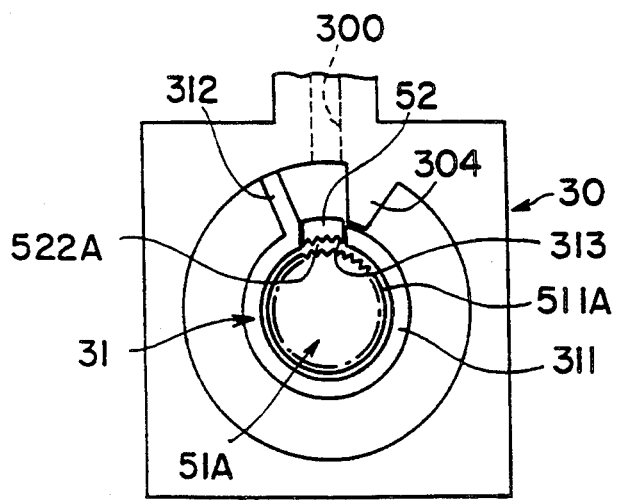
FIG. 3 is a schematic side elevational view of a second embodiment with a modified clutch means.

In the second embodiment, shown in FIG. 3, the driven engagement member and the driving engagement member are modified. The clutch key 52 is received in a hole, i.e. the rectangular hole 313 on the ring segment 311 of the rotor 31, so that it can be freely displaced in the radial direction, and the clutch key 52 serves as a driving engagement member. On the inner face of the clutch key 52 are engagement teeth 522A that engage outer peripheral teeth 511A of a gear 51A. In the example shown, both teeth 522A and 511A have normal gear teeth profiles, but they may be formed as ratchet teeth as in the first embodiment. The other features of the arrangement of FIG. 3 are virtually the same as the first embodiment. Thus, the same reference numerals as in the first embodiment are given to represent the corresponding members or components, and a detailed description is not given here. (The same applies hereinafter.) The operation of this embodiment is the same as that of the first embodiment.

Figures 4A, 4B:
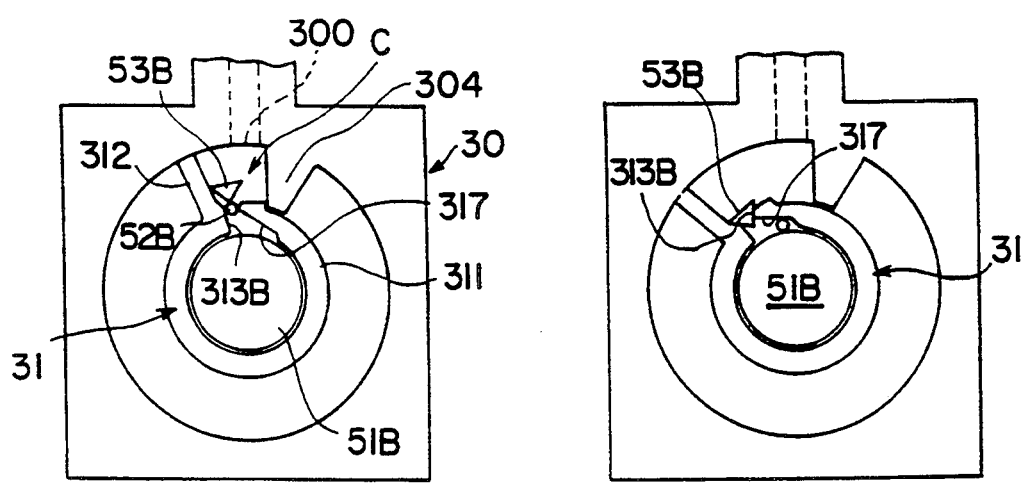
FIGS. 4A and 4B are schematic side views of a third embodiment, with a modified clutch means, showing its operation.

FIGS. 4A and 4B show a third embodiment, in which the driven engagement member and the driving engagement member are modified. In the ring segment 311 of the rotor 31 is a hole 313B having an outer portion of conical shape. A ball 52B is received in the hole 313B so as to be displaceable in the radial direction by gas pressure. On the inner wall of the ring segment 311 of the rotor 31 is a groove 317 that extends backwardly relative to the rotating direction of the rotor from inner end of the circular hole 313B. This groove 317 is a tapered groove, which is deeper on the side connected to the circular hole 313B and becomes gradually shallower toward its opposite side. On the back of the ball 52B, a valve 53B of conical shape is provided. A roller 51B without outer teeth serves as the driven engagement member.

When gas pressure is applied to the pressure chamber C of this embodiment, the ball 52B is pushed out of the hole 313B by gas pressure toward to the roller 51B. Upon rotation of the rotor 31, the ball 52B moves backward in the groove 317. As shown in FIG. 2B, the ball finally enters into a gap between outer periphery of the roller 51B and the groove 317, and the rotor 31 is engaged with the roller 51B by a wedge action. In the meantime, the valve 53B is seated in the conical portion of the hole 313B and prevents leaking of excessive gas. The operation after this stage is the same as in the first embodiment.

Figure 5:
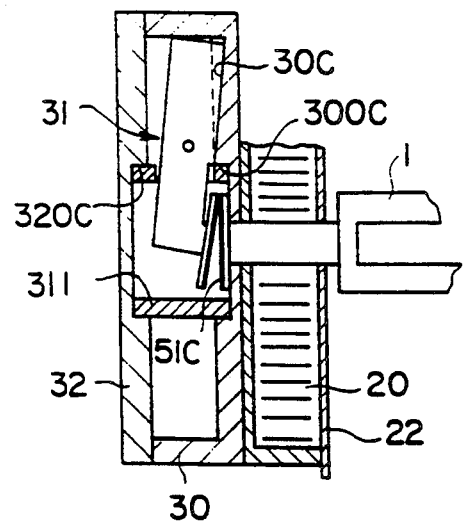
FIG. 5 is a schematic cross-sectional view of a fourth embodiment, also with a modified clutch means, and a part of a belt retractor.
Figure 6:
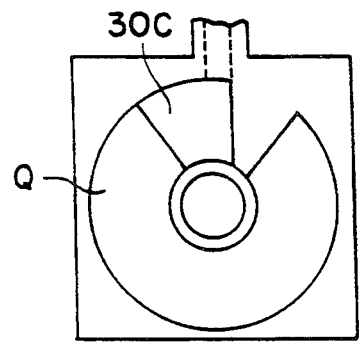
FIG. 6 is a side view of a cylinder portion of the fourth embodiment.
Figure 7:
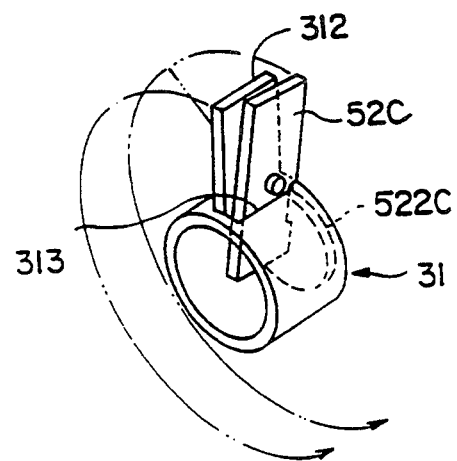
FIG. 7 is a perspective view of a rotor of the fourth embodiment.

FIG. 5 to FIG. 7 schematically illustrate a fourth embodiment of the invention, where again the driven engagement member and the driving engagement member are further modified. Whereas the driving engagement member is moved by gas pressure and the two engagement members are engaged in the rotating direction in the above three embodiments, the driving engagement member is operated by rotation of the rotor in this example, and the two engagement members are engaged in a direction perpendicular to the rotating direction.

As shown in the perspective view of FIG. 7, a movable vane 52C serving as a driving engagement member is pivotally mounted on the back of the vane 312 of the rotor 31, and a friction plate 522C is mounted on inner end of the movable vane 52C. The intermediate portion of the movable vane 52C is inserted into an opening 313 of the rotor 31, and this prevents leakage of excessive gas. A friction plate 51C mounted on an end of the take-up shaft 1 and serving as the driving engagement member is located face-to-face to the friction plate 522C. The upstream portion of the operating space Q of the cylinder 30 has a tapered surface 30C, and as shown in FIG. 5 and FIG. 6, this surface is inclined with its outer portion wider and narrowed down in the rotating direction of the rotor, terminating at a predetermined position. In this example, the ring segment 311 of the rotor 31 has its outer periphery supported in circular holes 300C and 320C of the cylinder 30 and the cover 32. In FIG. 5, the reference numeral 22 represents the side wall of a frame of the retractor, and 20 a winding spring unit of the retractor.

In this pretensioner, the movable vane 52C initially is biased clockwise around the pivot point by the weight of the friction plate 522C mounted on its inner end, and the two friction plates 522C and 51C are in a non-engaged state. When gas is supplied to the actuator, gas pressure is applied on the backs of the vane 312 and the movable vane 52C, and the rotor 31 is rotated in the direction shown by the two-dot chain line in FIG. 7. Upon rotation, the movable vane 52C moves along the tapered surface 30C. The skew of the movable vane 52C with respect to the vane 312 is gradually decreased and is eliminated at the end of the tapered plane 30C. The friction plate 522C mounted on the inner end of the movable vane 52C is engaged with the friction plate 51C of the take-up shaft 1. Thus, the rotor 31 and the take-up shaft 1 are engaged with each other. The subsequent operation is the same as the above-described embodiment.

Figure 8A:
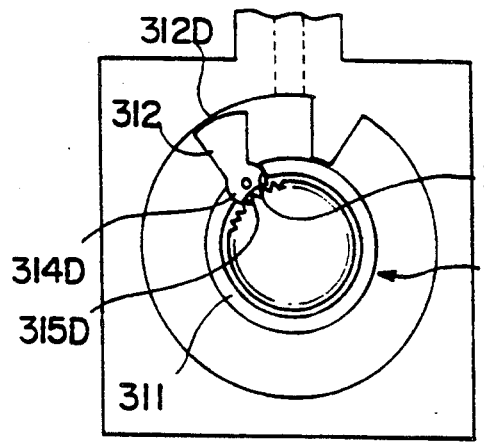
FIGS. 8A and 8B are schematic side views of a fifth embodiment, showing two stages of its operation.
Figure 8B:
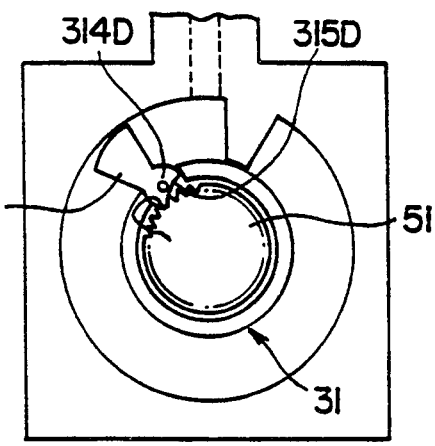

FIG. 8A and 8B show a fifth embodiment of the invention in simplified form. The vane 312 of the rotor 31 is pivotally mounted on the ring segment 311 and serves as a movable vane. The inner end of the vane 312 serves as a driving engagement member.

The driven engagement member is a ratchet wheel 51, as in the first embodiment. The vane 312 of the rotor 31 has an outer cylindrical surface 312D having its axis at the pivot, a small diameter cylindrical section 314D, and a concave inner cylindrical surface 315D in clearance from the teeth of the ratchet wheel 51. The surface 312D is in sliding contact with the outer wall of the operating space of the cylinder, and the small diameter cylindrical section 314D is pivotally fixed on the ring segment 311 in the cylindrical hole 313D formed on the ring segment 311 of the rotor 31.

The vane 312 is tilted forward in the rotating direction of the piston around the pivot axis when gas pressure is applied. As the result, a projection formed at the juncture of the section 314D with the surface 315D is engaged with a tooth of the ratchet wheel 51. With this engaged state maintained by gas pressure, the rotor 31 is rotated together with the ratchet wheel 51. In this example, too, the subsequent operation is the same as in the above-described embodiments.

Figure 9:
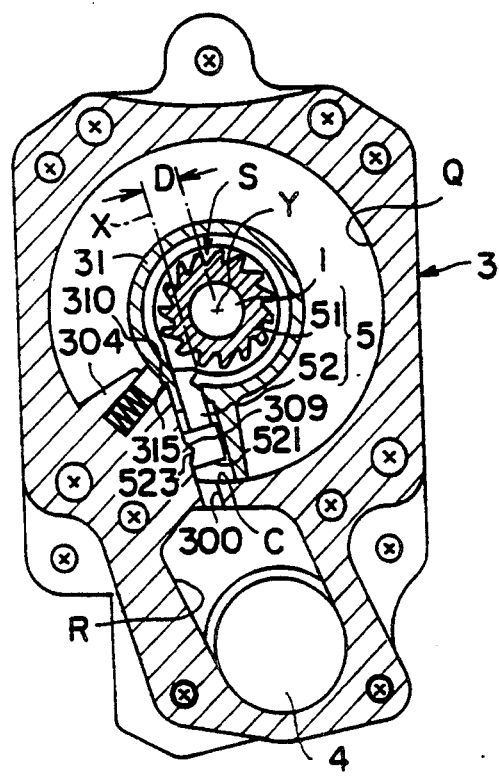
FIG. 9 is a transverse cross-sectional view, showing a sixth embodiment of the present invention.

In the first embodiment, the clutch key is arranged in such manner that its axis of movement and the axis of the ratchet wheel cross each other on the same plane, whereas the clutch key 52 may be arranged in such manner that its axis of movement X crosses the axis Y of the ratchet wheel 51 with a certain spacing D, as shown in FIG. 9. (Hereinafter, this condition is referred to as "offset.") A sixth embodiment with such an arrangement is shown in FIGS. 9 to 12 and will now be described.

Figure 10:
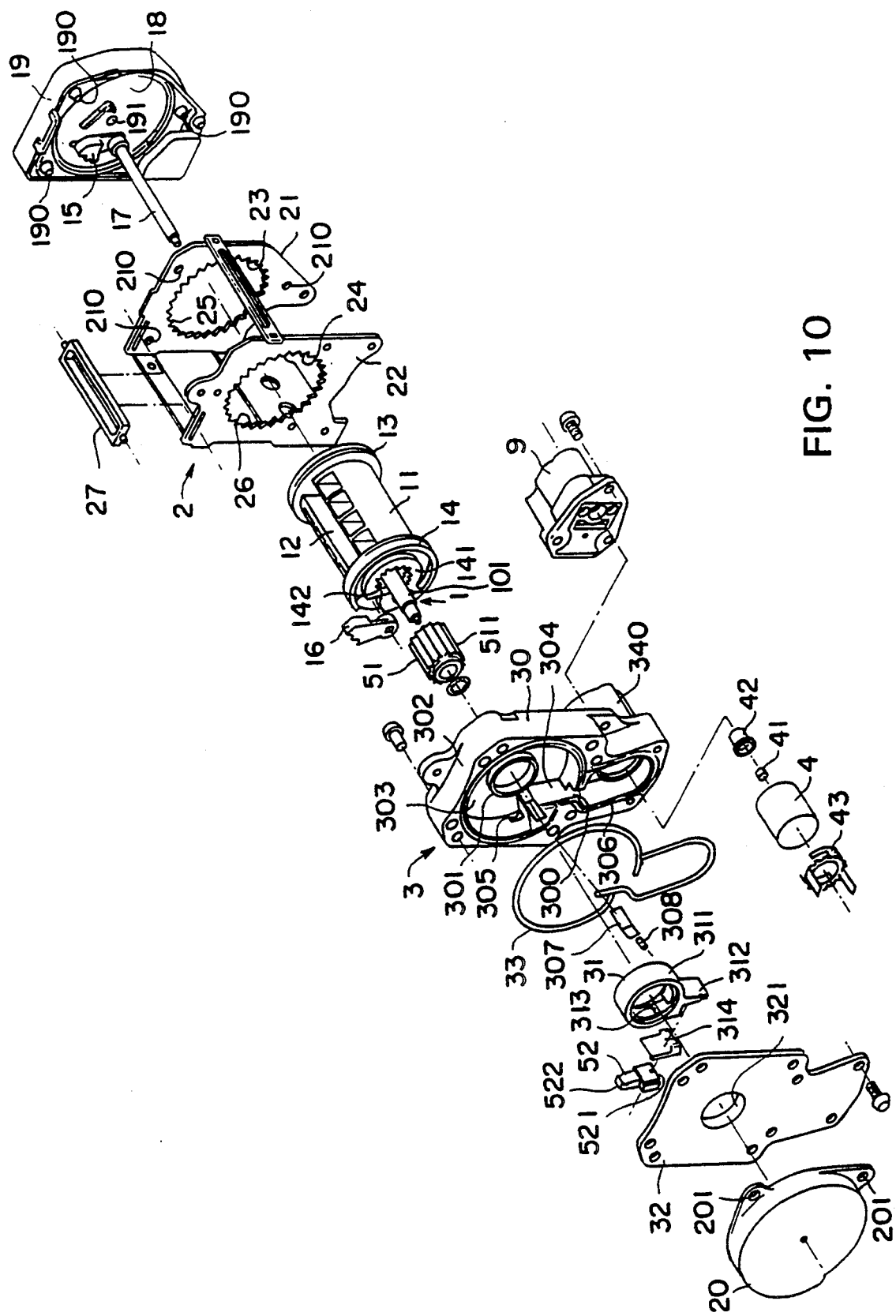
FIG. 10 is an exploded perspective view of the sixth embodiment.

The pretensioner of FIGS. 9 to 12 comprises a rotary actuator 3 mounted on a pretensioner base 2, which also serves as a retractor frame as shown in FIG. 10 and supports a rotatable take-up shaft 1, a gas generator 4 for supplying operating gas to a pressure chamber 3 of the actuator 3, and clutch means 5 for connecting a rotor 31, serving as rotating output member of the actuator 3, to the take-up shaft 1 by gas pressure supplied to the pressure chamber C. The actuator 3 has a chamber of annular form around a space S, and clutch means 5 is disposed in the space S. The clutch means 5 comprises a ratchet wheel 51 attached on the take-up shaft 1 and a clutch key 52 movably supported on the rotor 31. The clutch key 52 has an axis of movement X directed in a direction to cross the axis of rotation Y of the ratchet wheel 51 with a certain spacing D (i.e., offset), and a pressure receiving portion 521 faces toward the pressure chamber C.

Referring to FIG. 10, the take-up shaft 1 is integrated into a reel for taking up a belt webbing (not shown). The reel 11 is provided with a slit 12 for receiving an end of the belt webbing, and flanges 13 and 14 on both ends. On one of the flanges 14 is an annular collar 141 that slightly protrudes axially and surrounds the periphery of the take-up shaft 1. Internal teeth 142 on the collar 141 engage with outer teeth 511 so that the inner end of the ratchet wheel 51, which is separate from the take-up shaft 1, can be inserted, and this serves as a detent when the ratchet wheel 51 is engaged with the take-up shaft 1.

The pretensioner base 2 is U-shaped and supports the ends of the take-up shaft 1 and also acts as a retractor frame. Holes 23 and 24 in the side walls 21 and 22 where the reel flanges 13 and 14 are accommodated, have internal ratchet teeth 25 and 26 that are engaged by locking pawls 15 and 16 that are operated by an emergency locking mechanism 18, and are mounted on a connecting shaft 17 supported by the reel. The retractor has a winding spring unit 20. A belt guide 27 is affixed to the frame and guides the belt. webbing.

The actuator 3 comprises a cylinder 30 constituting its fixed member, a rotor 31 serving as rotating member, and a cover 32 to close the open outer end of the cylinder 30. The cylinder 30 consists of a block, which has an operating space Q (FIG. 9) having one end open that is defined by an annular inner wall 301, an outer peripheral wall 302 and an end wall 303, and further includes a bulkhead 304 and a supply chamber R that communicates with the operating space Q. A gas-introducing groove 300 near one side of the bulkhead 304 communicates the supply chamber R and the operating space Q. Near the other side is an exhaust hole 305, which passes through the outer peripheral wall 302 from the operating space Q. A seal groove 306 is provided on the open end surface of the cylinder 30 around the outer periphery of the operating space Q and the supply chamber R. An annular axial flange 321 protrudes from the inner end surface of the cover 32, facing the inner peripheral wall 301 of the cylinder 30 with a certain spacing and serving as a bearing to support the inner bore of the rotor 31.

The rotor 31 serves as the inner peripheral wall of the operating space Q and comprises a ring segment 311 to define the space S (FIG. 9) and a vane 312 extending from the ring segment 311 in the radial direction and functioning as a pressure-receiving portion. On the upstream side of the vane 312, relative to its direction of rotation, a rectangular hole 313 through the ring segment 311 receives the clutch key 52. The hole 313 is in an offset position relative to the axis of the take-up shaft 1. On the inner side of the ring segment 311, a graded hole with both ends enlarged is provided to receive the inner peripheral wall 301 of the cylinder 30 and the axial flange 321 of the cover 32.

The pressure-receiving surface of the vane 312 is fitted with a sealing member 314 having a continuous seal lip on both side edges and the outer peripheral edge. This sealing member 314 is attached to the rear surface of the vane 312 by engagement of hooks in notches at the corners of the tip of the vane 312 and prevents gas leakage from the pressure chamber C of the operating space Q into the back pressure chamber when the rotor 31 is rotated.

The clutch key 52 of the clutch mechanism is received in the hole 313 and is in sliding clearance so that it can be freely displaced along its axis of movement. The clutch key 52 comprises a pressure-receiving head to receive gas pressure and a tip 522 serving as the engaging means with the outer teeth 511 of the ratchet wheel 51. The tip 522 is arranged to face toward the ratchet wheel 51. On the rear surface of the clutch key 52, a stopping groove 523 is formed perpendicularly to the moving direction of the clutch key 52, as shown in FIG. 9. This groove 523 is engaged with a ridge 309 provide face-to-face to the bulkhead 304 of the cylinder 30 and serves as a stopping means for holding the clutch key 52 in its initial "set" position.

A deep radial groove is formed on the bulkhead 304. A sealing member 307 accommodated in the groove is pushed by a spring 308 inserted behind it and forms a sliding seal with the outer peripheral surface of the ring segment 311 of the rotor 31. On the front seal surface of the sealing member 307, an engagement groove 310 is formed parallel to the axis of the rotor 31, as shown in FIG. 9, and a ridge 315 is formed on the outer periphery of the ring segment 311 of the rotor 31 facing the groove 310. The ridge and groove engage each other and serve as a releasable stop for holding the rotor 31 at its initial set position.

An elastomer seal 33 is received in the seal groove 306 that runs along the circumferences of the supply chamber R and the operating space Q, protrudes between them and toward the bulkhead, and fulfills a sealing function between the cylinder 30 and the cover 32.

The gas generator 4 is of the type in which a propellant in a case is ignited by a primer 41 and burns. It is incorporated in the cylinder 30 in this example. The gas generator 4 is received in a chamber 340 in the cylinder 30 parallel to the take-up shaft axis. A hole in the bottom of the chamber 340 allows a firing pin to be propelled into the generator 4 when an acceleration sensor 9 is operated to ignite the gas generator 4. A seal sleeve 42 with a collar is inserted into the hole from the chamber 340, and the gas generator with the primer 41 attached to it is inserted into the chamber 340 and is held in place by a snap ring 43.

The clutch means 5 comprises a ratchet wheel 51, serving as a take-up shaft-engaging means, and the clutch key 52, serving as an actuator-engaging means. The teeth 511 on the periphery of the wheel 51 are tilted backward against the rotating direction of the ratchet. To match them, the tip 522 of the clutch key 52 has an inclined tooth. The tilted teeth ensure engagement of the tip 522 with the teeth 511 when the ratchet wheel 51 is driven by the clutch key 52 and permit disengagement of the tip 522 from the ratchet wheel teeth 511 during reverse driving from the ratchet wheel 51, thus making the clutch means 5 work as an overrunning clutch.

These component parts are arranged on the frame by the following procedure, although the procedure is not limited to this: First, an assembly in which the locking mechanism 18 is assembled on one end of the reel 11 is inserted into openings 23 and 24 on both sides of the fame. The locking mechanism 18 is centered and mounted when projections 190 are inserted into mounting holes 210 of the frame so that a cover 19 having a take-up shaft support hole 191 covers the locking mechanism 18. Next, the ratchet wheel 51 is engaged with a large diameter portion 101 of the take-up shaft 1, one end of which is supported as described above. In this case, the outer teeth 511 of the ratchet wheel 51 are engaged with the inner teeth 142 so that it is not rotatable with respect to the take-up shaft 1. Next, the cylinder 30 is fixed on the other side wall 2 by a bolt. Further, the rotor 31 incorporated with the clutch key 52 and the sealing member 314 as well as a seal 33 are inserted from the open end of the cylinder 30. After the sealing member 307 combined with a spring 308 is assembled, the lid 32 is affixed on the cylinder 30 by screws. Finally, the spring unit 20 is installed by engaging a projection 201 on the spring unit into a mounting hole which extends from the lid 32 to the cylinder 30. Thus, the take-up shaft 1 has one end supported on one side of the frame through the cover 19, and the other end supported on the other side of the frame through the spring unit 20.

Figures 11A, 11B, 11C, 11D, 11E:
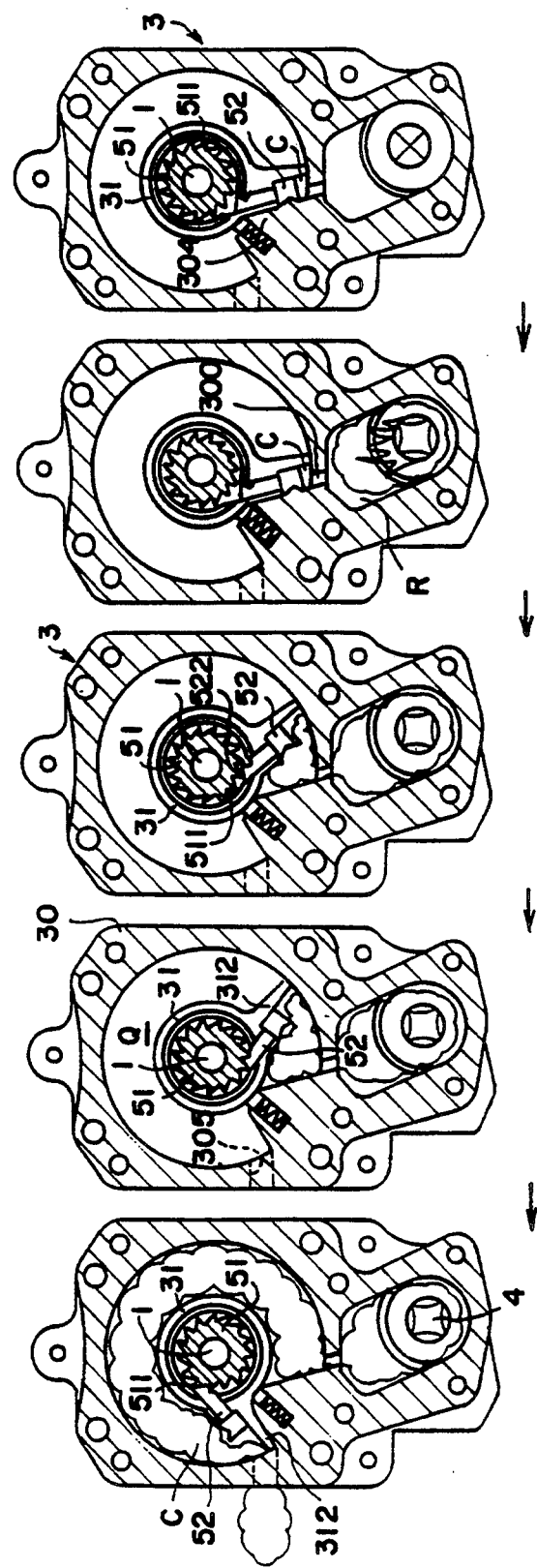
FIGS. 11A to 11E show the operation of the sixth embodiment, step by step.

FIG. 11 shows sequentially the operation of the pretensioner of FIGS. 9 to 12. When the pretensioner is set and not operated, it is at the position of FIG. 11A in which the back of the clutch key 52 inserted into the rotor 31 touches the bulkhead 304. Under this condition, the pressure chamber C has its smallest volume, and the clutch key 52 is not engaged with the teeth 511 of the ratchet wheel 51 since the groove 523 in the rear of the clutch key is fitted to the ridge 309 of the cylinder bulkhead 304 (FIG. 9). Thus, the take-up shaft 1 is completely separated from the actuator 3 and is freely rotatable, and the normal function of the retractor is maintained.

When an acceleration is detected and the firing pin of the sensor 9 (FIG. 10) is operated, the primer 41 of the gas generator 4 is ignited (FIG. 11B), and the gas generated by combustion of propellant is introduced into the pressure chamber C through the supply chamber R and the gas introducing groove 300 (FIG. 11C). With gas pressure applied on its pressure-receiving head 521, the clutch key 52 is pushed inwardly along its offset axis of movement. The tip 522 enters a trough between two teeth 511 of the ratchet wheel 51, and the rotor 31 is engaged with the ratchet wheel 51 through the clutch key 52. Thus, the take-up shaft 1 is now coupled to the actuator 3.

Gas pressure is also applied on the vane 312 of the rotor 31 and the pressure force acts on the back of the vane 312, whereby the rotor 31 is rotated counterclockwise around the shaft as shown in FIG. 11D. The pressure in the back pressure chamber of the operating space Q (downstream from the vane) generated by this rotation is released into the atmospheric air through the exhaust hole 305, and this prevents occurrence of resistance due to a pressure increase in the back pressure chamber. As the result, the rotating force of the rotor 31 is transmitted to the take-up shaft 1 through the clutch key 52 and the ratchet wheel 51.

Upon rotation of the take-up shaft 1, a segment of the belt is wound onto the take-up shaft 1 and pretension is imparted to it by tightening of the belt. Finally, the rotor 31 reaches the position shown in 11E. When it is at this position, the pressure chamber C is also opened to the atmospheric air, and the remaining gas pressure is also discharged through the exhaust hole 305. However, the take-up shaft 1 and the reel continue rotation by inertia because the teeth 511 of the ratchet wheel 51 push the clutch key 52 in its disengaging direction.

Thus, the take-up shaft 1 is released from the rotor 31, and the rotation of the take-up shaft 1 is continued. The rotation by inertia continues until the belt tension and the rotary moment of inertia of the take-up shaft and reel reach equilibrium. Belt pretension due to this rotation can be set to about ½ of the pulling by rotor rotation, although it depends upon the quantity of the propellant loaded in the gas generator 4. Thus, the operation to give pretension is completed. After this operation is completed, the pulling out of the belt is blocked by the engagement of the lock pawls 15 and 16, components of the retractor locking mechanism, with the ratchet teeth 25 and 26 in the frame.

Figure 12A:
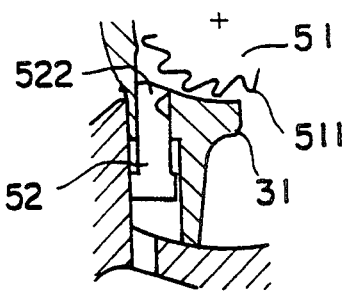
FIGS. 12A to 12D are fragmentary views of the sixth embodiment, showing how the clutch engages.
Figure 12B:
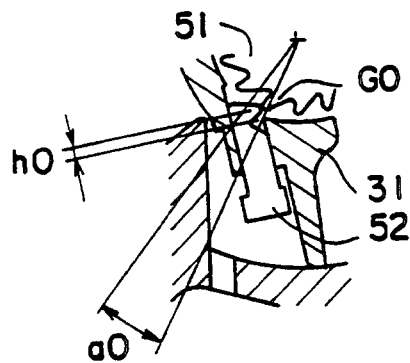
Figure 12C:
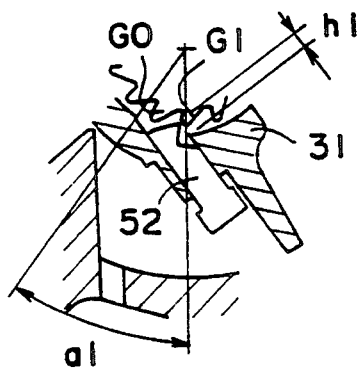
Figure 12D:
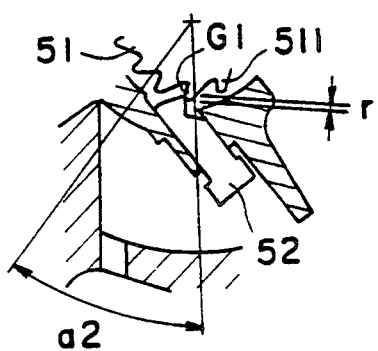

Next is a detailed description of the engaging operation of the clutch means 5. FIG. 12 shows what happens when the addendum of a tooth 511 of the ratchet wheel 51 is initially struck by the addendum of the tip 522 of the clutch key 52 under the worst of the possible engagement conditions. From the initial state, as shown in FIG. 12A, pushing of the clutch key 52 by gas pressure and the rotation of the rotor 31 are started at the same time, the rotor is rotated by an angle a0, and an addendum collides against the tooth G0 as shown in FIG. 12B. In this case, it is supposed that the distance in the offset direction between the addendum and the inner periphery of the ring segment is h0. Under this condition, the ratchet wheel 51 is still stopped, and the rotor 31 continues to accelerate at a certain angular acceleration. The velocity of the clutch key 52 in the offset direction is 0. Failing to engage under this condition, the clutch key 52 continues rotation by a certain angle from this position, and it is again accelerated from the velocity 0 until the rotating angle reaches a1 and the next outer tooth G1 is reached, as shown in FIG. 12C. The sum h1 of the moving distance in the offset direction by this re-acceleration and the moving distance up to the initial addendum collision is always longer than the distance h0. In particular, when the rotor 31 and the clutch key 52 are made of the same material, the inertial mass of the clutch key 52 is far lower than the inertial mass of the rotor 31. Thus, re-acceleration occurs while the rotor 31 is accelerated from the outer tooth G0 to G1 and rotated by an angle a2, and sufficient engagement allowance is obtained as shown in (D) until tip of the pawl 522 finally hits the next outer tooth G1. Therefore, the clutch key 52 is engaged with the next outer tooth G1 even in the worst case, regardless of the positional relationship with the addendum of the outer tooth 511 of the ratchet wheel 51. The rotor rotating angle a2 up to this engagement is about 38 degrees when the clutch key 52 and the rotor 31 are made of steel.

Studying the colliding condition of the clutch key 52 against the outer tooth 511 of the ratchet wheel 51 when the clutch means 5 is in engaging operation, the working point of the impact force is deviated from the axial line Y by a distance D due to the offset. Most of the impact force is turned to rotary moment around the axial line Y, and the component in the direction of the axial line Y becomes very low. As the result, the bending load exerted on the take-up shaft 1 by clutch engagement can be kept very small.

Figure 13:
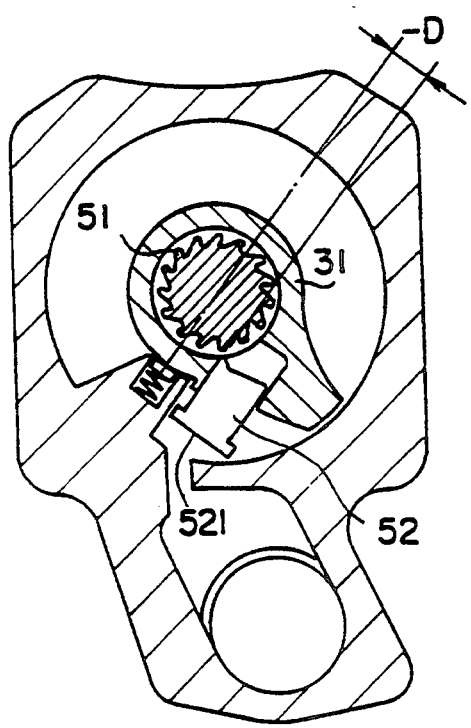
FIG. 13 is a transverse cross-sectional view of a seventh embodiment.

FIG. 13 shows a seventh embodiment in which the interaxial distance (offset) is set to −D by setting the offset direction of the clutch key 52 to the direction opposite to that of the above embodiment. Even in this arrangement, the same operation as in the sixth embodiment can be achieved. However, when the offset direction is set forward with respect to the rotating direction of the ratchet wheel 51, it is no longer certain that the force in the engaging direction due to rotation of the rotor 31 is mechanically applied on the clutch key 52. Thus, the pressure-receiving surface 521 of the clutch key 52 must be of sufficiently large area to obtain the engaging force from gas pressure acting on the clutch key.

FIGS. 14 to 18 show an eighth embodiment in which the clutch means is slightly modified from the sixth embodiment. In this example, a key connector 53 is added for sequence control of the transmission of the operating gas pressure to the clutch key 52 and supply of the operating gas to the pressure chamber C. In this case, the head 521 of the clutch key 52, serving as a pressure-receiving portion to receive gas pressure, also acts as a connection with the key connector 53, and the key connector 53 acts as stopping means for holding the clutch key 52 at the initial set position.

Figure 15:
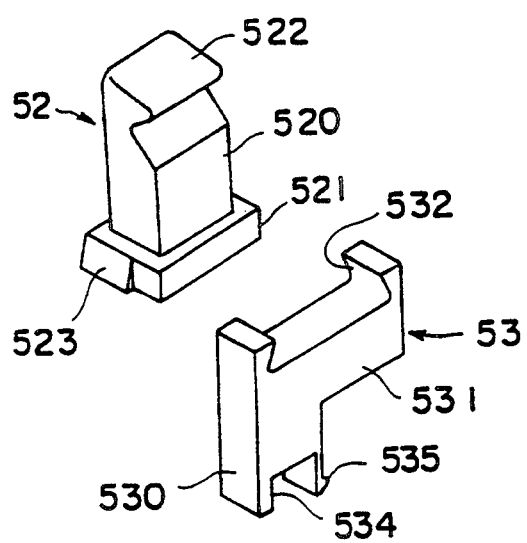
FIG. 15 is an exploded perspective view showing details of the clutch key and key connector of the eighth embodiment.

As shown in FIG. 15, the clutch key is made of steel and comprises a rectangular head 521, a guide 520 in form of rectangular column, and a tip 522. Projections 523 extending toward the ends of the head are provided on both sides of the head 521. The key connector 53 is made of a polymeric material and comprises a leg segment 531 (for connection with the clutch key 52) and a guide segment 530, forming an L-shape as a whole. The leg segment 531 is provided with a dovetail groove 532 that engages the projection 523 of the clutch key 52. On the tip of the guide segment 530 to be fitted closely in a groove 300 (for gas supply and key connector insertion) of the cylinder 30, a control groove 534 is provided. On the forward end of a wall, which defines said groove and is elastically displaceable in the direction of the groove because of its thinness, a hook 535 is formed outwardly with respect to the groove.

Figure 14:
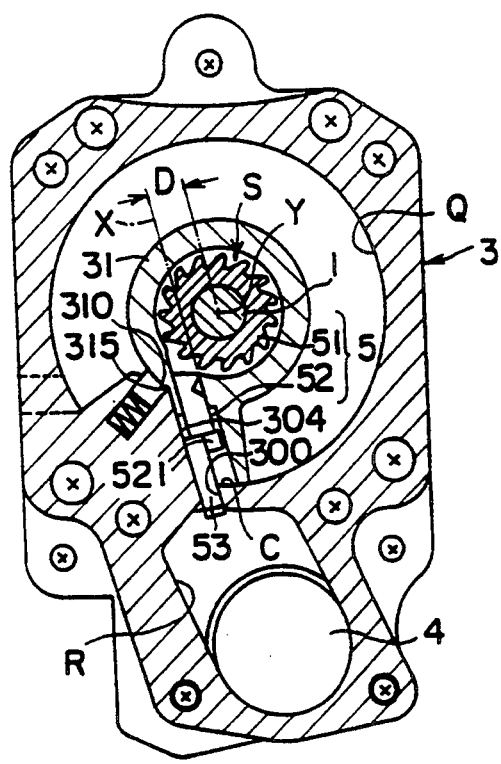
FIG. 14 is a transverse cross-sectional view of an eighth embodiment of the invention.

The clutch key 52 and the key connector 53 are connected with each other by engaging the projection 523 of the clutch key with the dovetail groove 532 of the key connector. When combined, the clutch key has its guide 520 engaged with a rectangular hole 313 of the rotor 31, and the key connector has its guide segment 530 engaged with the groove 300 of the cylinder 30 as shown in FIG. 14. In this case, the hook 535 is engaged with a corner where the peripheral wall of the supply chamber R crosses the groove 300, and the portion of the leg segment 531 opposite to the dovetail groove touches the peripheral wall of the cylinder 30. In this position, the guide segment 530 of the key connector 53 virtually blocks the groove 300 over its entire length and shuts off the supply chamber R from the pressure chamber C. The control groove 534 sets the sealing distance from the inner end of the peripheral wall of the cylinder to the bottom of the control groove 534 so that it becomes equal to the stroke until the addendum collision occurs between the clutch key 52 and the ratchet wheel 51.

Figure 16:
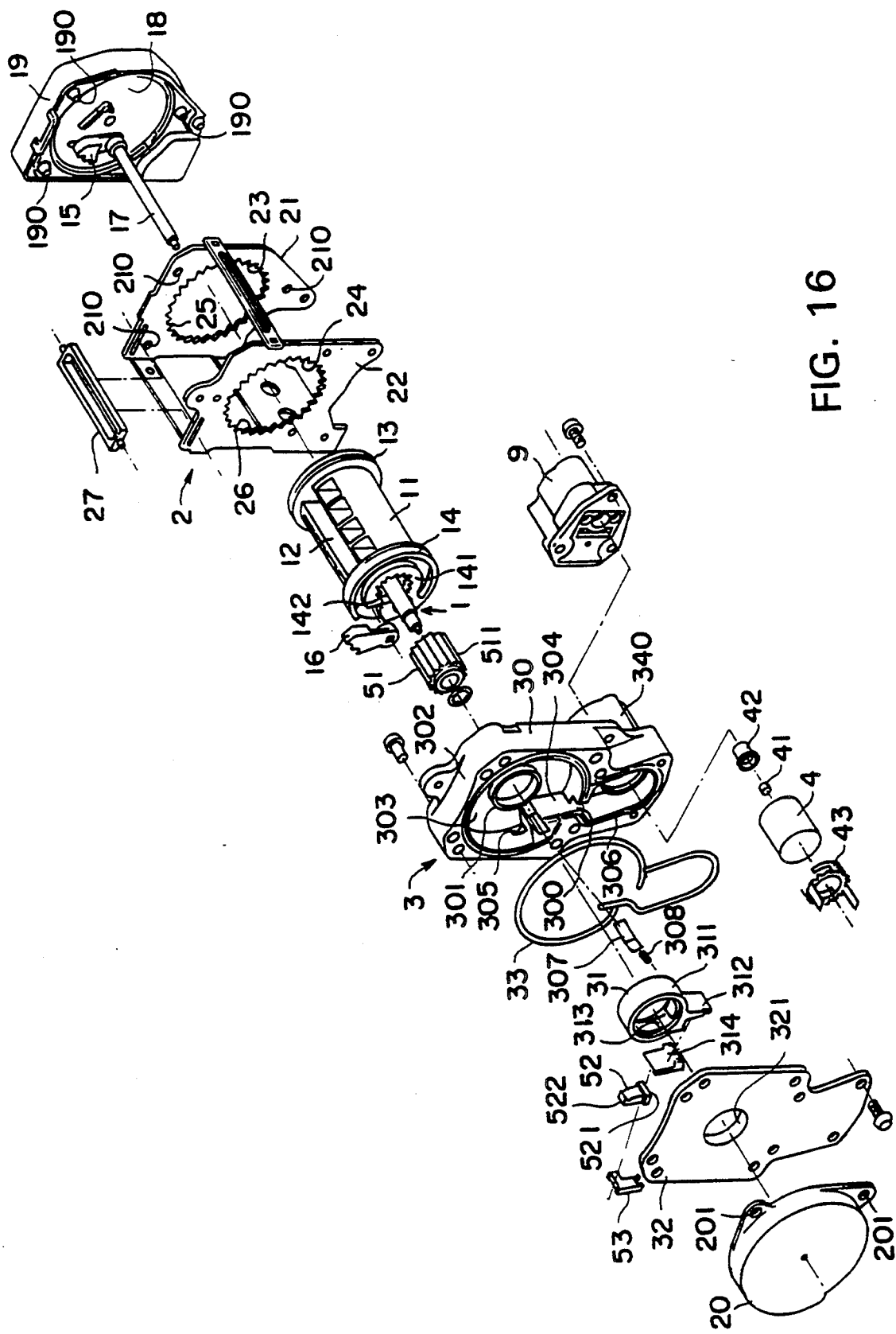
FIG. 16 is an exploded perspective view of the eight embodiment.

The features other than described above of this eighth embodiment are the same as those of the sixth embodiment. Thus, while the entire arrangement is shown in FIG. 16, no detailed description is required or given here.

FIGS. 17A to 17F shows in stages the operation of a pretensioner according to the eighth embodiment. When not in operation, the rotor 31 is at the position shown in FIG. 17A, in which the back of the clutch key 52 inserted into the rotor touches the bulkhead 304. Under this condition, the pressure chamber C has its smallest volume, and the clutch key 52 is positioned by the key connector 53 (FIG. 14) and is in clearance with the teeth 511 of the ratchet wheel 51. Therefore, the take-up shaft 1 is completely separated form the actuator 3 and is freely rotatable, and the retractor can function normally.

When acceleration is detected and the firing pin of a sensor 9 (FIG. 16) is operated, the primer 41 of the gas generator 4 is ignited (FIG. 17B) and gas generated by combustion of the propellant is applied on the key connector 53 in the gas supply chamber R. The engagement by the hook 535 (FIG. 15) is released, and the key connector 53 is pushed along the groove 300. The clutch key 52 is pushed by the key connector 53 inwardly in the offset direction, and the tip is moved to such position that it touches the top of a tooth 511 of the ratchet wheel 51. The bottom of the control groove 534 of the key connector 53 reaches the outer peripheral surface of the pressure chamber C, and the supply of the operating gas into the pressure chamber C commences.

As the result, gas pressure is now also applied on the vane 312 of the rotor 31 and pushes on the back upstream surface of the vane 312. Thus, the rotor 31 starts to rotate counterclockwise around the shaft as shown in FIG. 17C. Upon the rotation, the pressure in the back pressure chamber in the operation space Q is released into the atmospheric air through the exhaust hole 305 of the cylinder 30, and this prevents occurrence of resistance due to pressure increase in the back pressure chamber. On the other hand, displacement of the clutch key 52 is continued. Soon, the pawl 522 of the clutch key 52 is engaged with an outer tooth 511 of the ratchet wheel 51, and the rotor 31 is engaged with the ratchet wheel 51 through the clutch key 52. At this time, the take-up shaft 1 is connected with the actuator 3. As shown in 17D, a rotating force on the rotor 31 is transmitted to the take-up shaft 1 through the clutch key 52 and the ratchet wheel 51.

Upon rotation of the take-up shaft 1, a segment of the belt is wound onto the take-up shaft 1 and pretension is imparted by tightening of the belt. When the rotor reaches the position shown in FIG. 17E, the pressure chamber C is also opened to the atmospheric air, and the remaining gas pressure is discharged. The take-up shaft 1 and the reel 11 continue to rotate thereafter by inertia. The subsequent operation is the same as that of the sixth embodiment.

Figure 18A:
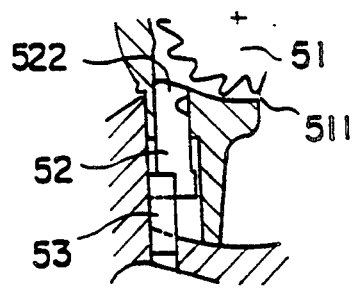
FIGS. 18A to 18D are fragmentary views of the eighth embodiment, showing sequentially engagement of the clutch.

FIGS. 18A to 18D show the engagement sequence when an addendum of a tooth 511 of the ratchet wheel 51 is initially struck by the addendum of the tip 522 of the clutch key 52 in the worst of the possible engagement conditions. First, the key connector 53 is pushed by gas pressure from the initial set state, as shown in FIG. 18A, and pushing of the clutch key 52 is started. When pushing proceeds and the addendum of the tip 522 of the clutch key 52 collides against an addendum of a tooth 511 of the ratchet wheel 51, addendum collision against tooth G0 in FIG. 18B occurs. When this happens, the bottom of the control groove 534 of the key connector 53 reaches the outer periphery of the pressure chamber C. From this position, gas supply to the pressure chamber C is started, and the rotor 31 begins to rotate. It is supposed that the distance in the offset direction between the addendum and inner periphery of the ring segment is h0. Under this condition, the ratchet wheel 51 is still stopped. The rotor 31 starts acceleration at a certain angular acceleration, and the velocity of the clutch key 52 in the offset direction is 0.

Having failed to achieve engagement, the clutch key 52 is rotated by a certain angle from this position and is accelerated again from the velocity 0 until the rotating angle becomes a1 and the next tooth G1 is reached. The sum h1 of the moving distance in the offset direction obtained by this re-acceleration and the moving distance up to initial addendum collision is always longer than the distance h0. In particular, when the rotor 31 and the clutch key 52 are made of the same material, the inertial mass of the clutch key 52 is far lower than the inertial mass of the rotor 31. Thus, re-acceleration occurs while the rotor 31 is accelerated from the outer tooth G0 to G1 and is rotated by an angle a2. Until the tip 522 finally collides against the next outer tooth G1, sufficient engagement allowance is obtained as shown in FIG. 18D. Therefore, the clutch key 52 engages with the next outer tooth G1, even in the worst case, regardless of the positional relationship, with the addendum of a tooth 511 of the ratchet wheel 51. When the clutch key 52 is made of steel and the rotor 31 is made of light alloy, i.e. when the inertial mass of the rotor 31 is closer to the inertial mass of the clutch key 52 than the case where these two are made of the same material, the rotor rotating angle a2 up to the engagement is still about 36.5 degrees.

Figure 18B:
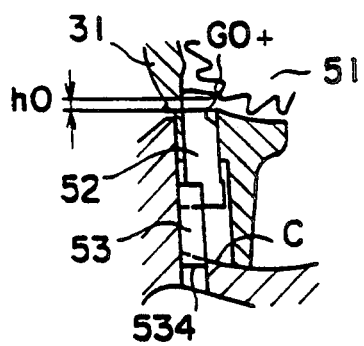
Figure 18C:
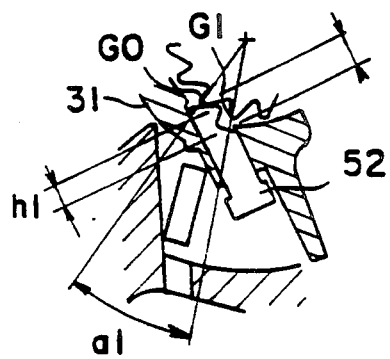
Figure 18D:
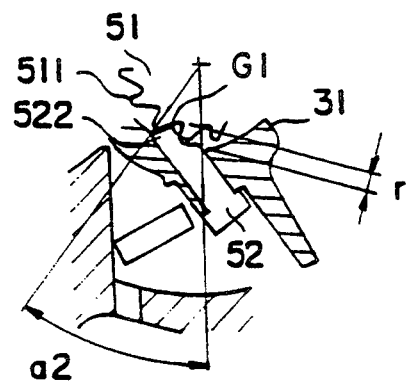

During the clutch engagement processes shown in FIGS. 18B and 18C, most of the key connector 53 is withdrawn from the groove 300, and the leg segment is pulled by the clutch key 52 when the rotation of the rotor 31 is started. Thus, the engagement at the dovetail groove is released, and the key connector is disengaged from the clutch key 52.

As an overrunning clutch in the present invention, the following may be used instead of those of in the above described embodiments: a dog clutch used in a transmission device with serrated engaging teeth so that it is released when driven in the reverse direction; a device in which a ball or a roller is pushed into a wedge-like space when driven in the forward direction and is released when driven in the reverse direction.

The embodiments of the present invention described above are intended to be merely exemplary, and numerous variations and modifications of the embodiments will be apparent to those skilled in the art without departing from the spirit and scope of the invention. All such variations and modifications are intended to be included within the scope of the invention, as set forth in the appended claims.

We claim:

1. A rotary actuator-operated seat belt pretensioner comprising a frame, a belt take-up shaft rotatably mounted on the frame, a rotary actuator mounted on the frame and including an annular pressure chamber, a rotating member having a ring portion defining an inner wall of the pressure chamber and a space within the chamber and having an integral vane extending across the pressure chamber, the ring portion extending circumferentially continuously around the periphery of the space within it and the vane portion being unitary with the ring portion and in sliding and sealed engagement with the pressure chamber walls, a gas generator for supplying pressurized gas to the pressure chamber to impart rotation to the rotating member, and clutch means interposed between the rotating member and the take-up shaft and including a driving engagement member to which a driving force is imparted by the rotating member and a driven engagement member received in the space within the ring portion of the rotating member and connected to the take-up shaft for rotation therewith, the ring portion having a hole adjacent the vane portion having side edges spaced-apart from the edges of the ring portion, the driving engagement member being received in the hole for movement into engagement with the driven engagement member, and the driving engagement member having a pressure-receiving surface facing the pressure chamber so as to be moved into engagement with the driven engagement member by a force acting on the pressure-receiving surface due to gas pressure supplied by the pressure generator to the pressure chamber.

2. A rotary actuator-operated seat belt pretensioner according to claim 1 wherein the driven engagement member of the clutch means is a ratchet wheel mounted on the take-up reel, and the driving engagement member of the clutch means includes a clutch key slidably received in the hole such as to block it and restrict gas flow from the pressure chamber into the space and movably carried by the rotating member for movement into engagement with the ratchet wheel along an axis of movement that intersects a portion of the ratchet wheel and is substantially orthogonal to the axis of rotation of the take-up reel shaft.

3. A rotary actuator-operated seat belt pretensioner according to claim 2 wherein the axis of movement of the clutch key and the axis of rotation of the take-up shaft are spaced apart by a predetermined distance.

4. A rotary actuator-operated seat belt pretensioner according to claim 2 wherein a clutch key connector is provided for sequence control of the movement of the clutch key into engagement with the ratchet wheel and of the rotation of the rotary member caused by the gas pressure introduced into the pressure chamber by the gas generator.

5. A rotary actuator-operated seat belt pretensioner according to claim 3 wherein a clutch key connector is provided for sequence control of the movement of the clutch key into engagement with the ratchet wheel and of the rotation of the rotary member caused by the gas pressure introduced into the pressure chamber by the gas generator.

6. A rotary actuator-operated seat belt pretensioner according to claim 1 wherein the clutch means is an overrunning clutch that allows rotation of the take-up shaft by inertia beyond the amount of rotation of the rotating member of the actuator.

7. A rotary actuator-operated seat belt pretensioner comprising a frame, a belt take-up shaft rotatably mounted on the frame, a rotary actuator mounted on the frame and including an annular pressure chamber, a rotating member having a ring portion defining the inner wall of the pressure chamber and a space within the chamber and carrying a vane that extends across the pressure chamber, a gas generator for supplying pressurized gas to the pressure chamber to impart rotation to the rotating member, and clutch means interposed between the rotating member and the take-up shaft and including a driving engagement member to which a driving force is imparted by the rotating member and a driven engagement member received in the space within the ring portion of the rotating member and connected to the take-up shaft for rotation therewith, the ring portion of the rotating member extending circumferentially continuously around the periphery of the space within it and having a hole adjacent the vane portion having side edges spaced-apart from the edges of the ring portion, the vane being mounted on the ring portion for pivotal movement about an axis parallel to the axis of rotation of the rotor, and the driving engagement member being an engagement portion of the vane received in the hole and engageable with the driven engagement member upon pivotal movement of the vane due to a force acting on the vane produced by gas pressure in the pressure chamber generated by the gas generator.

8. A rotary actuator-operated seat belt pretensioner according to claim 7 wherein the engagement portion of the vane has circular cylindrical surfaces having their axes coincident with the pivot axis of the vane and slidably engaging edges of the hole in the ring portion of the rotating member.

9. A rotary actuator-operated seat belt pretensioner according to claim 7 wherein the vane has a circular cylindrical distal surface having its axis coincident with the pivot axis of the vane and slidably engaging and outer wall of the pressure chamber.

10. A rotary actuator-operated seat belt pretensioner according to claim 7 wherein the driven engagement member of the clutch means is a ratchet wheel mounted on the take-up reel and the engagement portion of the vane has a projection engageable with a tooth of the ratchet wheel.

* * * * *